United States Patent [19]

Shigemori et al.

[11] Patent Number: 4,578,733

[45] Date of Patent: Mar. 25, 1986

[54] SURGE VOLTAGE ARRESTER

[75] Inventors: Daizo Shigemori, Sagamihara; Haruo Kunii, Isehara; Masaaki Endo, Sagamihara, all of Japan

[73] Assignee: Kabushiki Kaisha Sankosha, Tokyo, Japan

[21] Appl. No.: 606,123

[22] Filed: May 2, 1984

[30] Foreign Application Priority Data

Jun. 25, 1983 [JP] Japan .............................. 58-98099[U]

[51] Int. Cl.[4] .............................................. H02H 9/06

[52] U.S. Cl. .................................... 361/120; 361/129; 313/306; 313/308

[58] Field of Search ............... 361/120, 129, 117, 118, 361/130; 313/306, 308, 325, 581, 594, 546, 231.11, 601, 602, 607, 231.41

[56] References Cited

U.S. PATENT DOCUMENTS

| | | | |
|---|---|---|---|
| 3,959,696 | 5/1976 | Lange et al. | 361/120 |
| 3,979,646 | 9/1976 | Peche et al. | 361/120 |
| 4,084,208 | 4/1978 | Bazarian et al. | 361/120 |

*Primary Examiner*—Patrick R. Salce
*Attorney, Agent, or Firm*—Schwartz, Jeffery, Schwaab, Mack, Blumenthal & Evans

[57] ABSTRACT

A surge voltage arrester wherein a pair of main electrodes are respectively fitted in a gastight fashion to both open ends of a hollow cylindrical body formed of insulating material, wherein the discharge planes of the main electrodes are set opposite to each other in a hollow cylindrical body wherein at least one electrically conductive member extends along the inner wall of the hollow cylindrical body in its circumferential direction and faces one of the main electrodes at a prescribed interval, wherein at least one narrow electrically conductive strip electrically connected to the electrically conductive member extends along the inner wall of the hollow cylindrical body in its axial direction and faces the other of the main electrodes at a prescribed interval, and finally wherein at least one external electrically conductive member extends along the outer wall of the hollow cylindrical body which is capacitively coupled to the electrically conductive member extending along the inner wall of the hollow cylindrical body. A surge voltage arrester embodying this invention which is constructed as described above suppresses a delay in the initiation of discharge when impressed with surge voltage, and which also prevents the occurrence of a variation in the discharge-initiating operation.

12 Claims, 3 Drawing Figures

SURGE VOLTAGE ARRESTER

BACKGROUND OF THE INVENTION

This invention relates to a surge voltage arrester, and more particularly, to a surge voltage arrester of a gas-filled discharged tube type.

At present, a surge voltage arrester of a gas-filled discharge tube type is widely accepted in order to protect, for example, a transmission line or electric implements connected thereto from an excessively high surge voltage. However, the above-mentioned conventional surge voltage arrester has the drawbacks that when a high surge voltage is impressed, a time delay sometimes takes place in initiating the discharge of said high surge voltage. Consequently, the surge voltage arrester unduly fails in its insulation ability, eventually resulting in an insulation failure, and ceasing to protect the above-mentioned implements from a damaging high surge of voltage.

To date, therefore, various proposals have been advanced to eliminate the above-mentioned undesirable malfunctions of the conventional surge voltage arrester. For instance, U.S. Pat. No. 3,588,576 sets forth a device intended to eliminate the time delay in the initiation of the discharge when a high surge of voltage is impressed upon the aforementioned elements requiring protection from a surge of voltage. Said patented device is characterized in that a conductive layer of lumped potential gradient is provided in the vicinity of the main electrodes adapted for the discharge of a surge voltage arrester. According to this prior art, the lumped potential gradient is concentrated in the vicinity of the main electrodes when a high surge voltage is impressed on said surge voltage arrester, thereby initiating the discharge across said main electrodes. The surge voltage arrester of a gas-filled discharged tube type described in the aforementioned United States patent comprises: hollow cylinder prepared from insulation material such as ceramic or glass; a pair of mutually facing main electrodes held in said hollow cylinder with their discharge planes set apart from each other; and narrow conductive layers formed in the ionization region of said interelectrode space which extend along the inner wall of said hollow cylinder in the axial direction thereof. The surge voltage arrester of the aforementioned United States patent is described as having the characteristics that when a high surge voltage is impressed on the surge voltage arrester, the electric lines of force are concentrated on an area defined between the end portion of said narrow conductive layer and the pair of the main mutually facing electrodes, thereby quickly ionizing gas held in the ionization region of the interelectrode space and consequently accelerating the discharge of said main electrodes.

However, the surge voltage arrester set forth in the previously mentioned U.S. Pat. No. 3,588,576 has the drawback that noticeable current discharge often takes place between the paired main electrodes used with the surge voltage arrester. The discharge leads to the sputtering of part of the main electrode-constituting material. Sputtered particles settle on the inner wall of the hollow cylinder surrounding the main electrodes producing a thin conductive layer which reduces the insulation property of said surge voltage arrester due to the bridging of the narrow conductive layers. The discharge-initiating voltage impressed across the main electrodes drop from a prescribed level due to the above-mentioned sputtering, thus rendering said discharge-initiating voltage unstable.

Another known surge voltage arrester proposed for the diminution of the drawbacks of the aforesaid U.S. Pat. No. 3,588,576 is the type described in the specification of the U.S. Pat. No. 4,056,753 allowed by the present patent applicant. The surge voltage arrester set forth in said U.S. Pat. No. 4,056,753 comprises: a hollow cylinder prepared from insulating material; a pair of mutually facing main electrodes fitted in an airtight fashion to both of the open ends of the hollow cylinder to define a closed chamber with their discharge planes set apart from each other; and two mutually facing conductive layers extending along the inner peripheral wall of the hollow cylinder in the circumferential direction at a prescribed interval from the main electrodes, said two conductive layers being respectively provided with a projection directed toward said mutually facing main electrodes. The surge voltage arrester proposed in said U.S. Pat. No. 4,056,753 in which the conductive layers and main electrodes are capacitively coupled can indeed eliminate the drawback of a drop in insulation resulting from the above-mentioned bridging of the conductive layers. However, the surge voltage arrester described in said U.S. Pat. No. 4,056,753 is still accompanied with the drawback that since the two conductive layers are respectively provided with a projection extending toward the mutually facing main electrodes, complexities arise in the manufacture of the subject surge voltage arrester. When the discharge of the main electrodes is initiated, a discharge is concentrated on said projections. Particles sputtered from the main electrodes collectively settle on said projections resulting in a decline in the discharge initiating voltage between the main electrodes, and variations in the operation of the subject surge voltage arrester. The conductive layers and main electrodes are capacitively coupled to a small extent through a gas sealed in the surge voltage arrester. Therefore, it is necessary for the realization of a capacitive coupling to reduce an interval between the conductive layer and main electrode, or to broaden the width of the conductive layer. Though this process can indeed improve the characteristic of the impulse sparkover the voltage, yet a limitation is imposed on the space between the conductive layer and main electrode when considering the insulation resistance of the subject surge voltage arrester itself, or when considering the discharge initiation voltage characteristics of said arrester when impressed with a different type of overvoltage from that of an impulse. Further an attempt to broaden the width of the conductive layer unavoidably leads to an increase in the steps in manufacturing a surge voltage arrester and, consequently, to a decline in the manufacturing efficiency.

In addition to the above-mentioned surge voltage arrester, U.S. Pat. No. 4,287,548 sets forth another surge voltage arrester comprising a gas-filled housing incorporating two main electrodes disposed opposite one another, said electrodes being supported in a gas tight fasion by the ends of a tubular insulating member having at least one coating of electrically conductive material extending over a portion of the interior length of said insulating member, having at least one electrically conductive surface on the exterior of said insulating member which at least partially overlaps said coating, and having a means adapted to establish an electric field between said coating and said surface.

However, the surge voltage arrester described in U.S. Pat. No. 4,287,548 with reference to FIGS. 1 to 6, and FIGS. 8 and 9 is accompanied with the drawback from a strip 3 constituted by a coating electrically conductive material is connected to the main electrodes. When, therefore, the discharge of a large current often takes place between the paired main electrodes, part of the material constituting the main electrode gives rise to sputtering by said discharge. The sputtered particles of said main electrode material settle on the inner wall of the hollow cylinder surrounding the main electrode, causing the discharge-initiating voltage between the main electrodes to fall below a prescribed level, or rendering said discharge-initiating voltage unstable. Further, FIG. 7 attached to said U.S. Pat. No. 4,287,548, illustrates a center ignition strip 3 which is overlapped at both ends by the electrically conductive coatings 2 connected to the main electrodes. The center ignition strip 3 is constituted by a narrower conductive layer whose ends extend toward the main electrodes, and are overlapped by the conductive coatings 2. When, therefore, a discharge is started between the main electrodes, the discharge is concentrated at the ends of said strip 3. As a result, the sputtered particles of the main electrode-constituting material collectively settle on the ends of the strip 3 resulting in a decline in the discharge-initiating voltage between the main electrodes, or in variations in the operation of the subject surge voltage arrester. Since the strip 3 is formed of a narrow conductive layer, the capacitive coupling of said strip 3 with the main electrodes in the insulation member is effected only be a small extent. To attain the prescribed capacitive coupling, therefore, an attempt should be made to reduce the interval between the strip 3 and the main electrodes held in the insulating member. Though improving the impulse discharge-initiating voltage characteristic, the above-mentioned attempt is accompanied with the drawback that the insulation resistance of the surge voltage arrester is reduced. And when impressed with an overvoltage different from that caused by the impulses voltage, the discharge-initiating voltage characteristic of said surge voltage arrester is deteriorated.

SUMMARY OF THE INVENTION

Accordingly, one object of this invention is to provide a surge voltage arrester which, when impressed with a surge voltage, can be operated without giving rise to a delay in the initiation of a discharge.

Another object of the invention is to provide a surge voltage arrester which is saved from a decline in discharge-initiating voltage.

Another object of the invention is to provide a surge voltage arrester whose discharge-initiating operation is free of variations.

Still another object of the invention is to provide a surge voltage arrester whose effective operation can be continued over a long period of time.

To attain the above-mentioned objects, this invention provides a surge voltage arrester comprising:

- a hollow cylindrical body prepared from insulating material;
- a pair of main electrodes which are fitted in a gastight fashion to both open ends of said hollow cylindrical body to jointly define a closed chamber in such a manner that the discharge planes of said paired main electrodes are set opposite to each other at a prescribed interval in said hollow cylindrical body;
- at least one electrically conductive member which extends along the inner wall of said hollow cylindrical body in its circumferential direction in such a manner that said electrically conductive member faces one of said main electrodes at a prescribed interval;
- at least one electrically conductive strip which is electrically connected to said electrically conductive member and which extends along the inner wall of said hollow cylindrical body in its axial direction in such a manner that said electrically conductive strip faces the other main electrode at a prescribed interval; and
- at least one external electrically conductive member which is electrically connected to said one main electrode and extends along the outer wall of said hollow cylindrical body in such a manner that said external electrically conductive member is capacitively coupled to said one electrically conductive member.

DETAILED DESCRIPTION OF THE PREFERRED EMBODIMENTS

Figure 1:
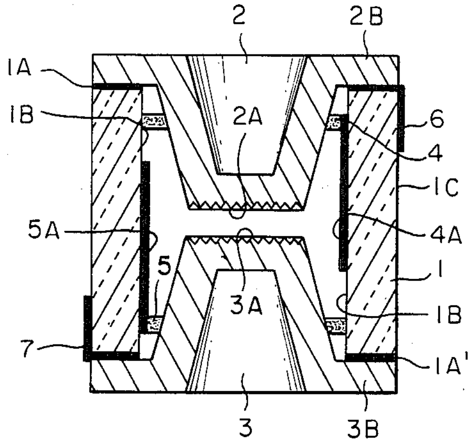
FIG. 1 is a longitudinal sectional view of a surge voltage arrester according to the first embodiment of this invention.

Referring to FIG. 1, reference numeral 1 denotes a hollow cylinder prepared from insulating material such as ceramic or glass. Both openings 1A, 1A' of said hollow cylinder 1 are fitted in a gastight fasion with the flanges 2B, 3B of a pair of main electrodes 2, 3 in such a manner that the discharge planes 2A, 3A of said main electrodes 2, 3 are set opposite to each other at a prescribed interval thereby constituting, for example, a gas-filled discharge tube. Electrically conductive members 4, 5 extend along the inner wall 1B of the hollow cylinder 1 in its circumferential direction at a prescribed interval from the corresponding main electrodes 2, 3. The electrically conductive members 4, 5 are respectively provided with narrow electrically conductive strips 4A, 5A which are electrically connected to said conductive members 4, 5 and extend along the inner wall 1B of said hollow cylinder 1 from one end to the other of the corresponding electrically conductive members 4, 5. These narrow electrically conductive strips 4A, 5A face the corresponding electrically conductive members 4, 5 at a prescribed interval. Further, there are provided external electrically conductive members 6, 7 which are electrically connected to the corresponding main electrodes 2, 3 and extend along the outer wall IC of the hollow cylinder 1 so as to be capacitively coupled to said electrically conductive members 4, 5 with the insulating material of the hollow cylinder 1 interposed therebetween. Said external conductive members 6, 7 are respectively formed of one, or more electrically conductive components extending along the outer wall 1C of the hollow cylinder 1 in its circumferential direction. Instead of being arranged as described above, said external electrically conductive members 6, 7 may be made to extend along the outer wall 1C of the hollow cylinder 1 in its circumferential direction so as to be capacitively coupled to said electrically conductive members 4, 5 with the insulating material of the hollow cylinder 1 interposed therebetween.

The aforementioned electrically conductive members 4, 5, narrow electrically conductive strips 4A, 5A and external electrically conductive members 6, 7 may be formed by applying, for example, an electrically conductive paint or drawn line with the lead of, for example, a pencil.

A description may now be made with reference to the accompanying drawing of the operation of a surge voltage arrester according to the first embodiment of this invention. Now let it be assumed that the main electrodes 2, 3 of the gas-filled discharge tube of FIG. 1 are connected to be terminals of the implements (not shown) in order to protect them from, for example, surge voltage. Surge voltage occurring between the main electrodes 2, 3 is impressed at the same time between the main electrodes 2 and the electrically conductive member 4, as well as between the main electrode 3 and the electrically conductive member 5 due to the capacitive coupling between the external electrically conductive members 6, 7 connected to the corresponding main electrodes 2, 3 and the electrically conductive members 4, 5 facing said external electrically conductive members 6, 7 with the insulating material of the hollow cylinder 1 interposed therebetween. The impression of the above-mentioned surge voltage establishes a substantially uniform electric field between the main electrodes 2 and 3, and a nonuniform electric field between the main electrode 2 and the electrically conductive member 4, as well as between the main electrode 3 and the electrically conductive member 5. The creation of said nonuniform electric fields gives rise to the production of ions and electrons in the interior of the hollow cylinder 1. As a result, the ions and electrons are accumulated in said electrically conductive members 4, 5, which in turn are charged to a high level, leading to the active ionization between the ions and electrons. Consequently, said active ionization permits a speedy discharge between the main electrodes 2, 3, thereby effectively preventing a delay in the initiation of a discharge between said main electrodes 2, 3.

In the above-mentioned first embodiment, the external electrically conductive members 6, 7 and the corresponding electrically conductive members 4, 5 are capacitively coupled with the insulating material of the hollow cylinder 1 interposed therebetween. Therefore, the surge voltage arrester of this invention ensures a higher capacitive coupling effect than the conventional surge voltage arrester in which the main electrodes and the conductive layers are capacitively coupled with the discharge tube gas interposed therebetween. In other words, the surge voltage arrester of this invention establishes a more nonuniform electric field than the prior art thereby improving the surge response property. Further advantages of the surge arrester of this invention are that an insulation interval between the electrically conductive members 4, 5 the main electrodes 2, 3, and the width of the electrically conductive members 4, 5 can be reduced, thereby enabling said electrically conductive members 4, 5 to be manufactured more easily than in the prior art. Also, the electrically conductive members 4, 5 and the main electrodes 2, 3 are not electrically connected thereby enabling said electrically conductive members 4, 5 to approach the respective opposite electrodes without being adversely affected by the voltage for initiating the discharge of the surge voltage of the alternative or direct current, thus reducing the impulse discharge-initiating voltage. To give the concrete experimental results proving the advantages of this invention over the prior art, the U.S. Pat. No. 4,056,753 describes that when the gas-filled discharge tube of the conventional surge arrester was impressed with an impulse voltage of 100 V/microsecond, a discharge was started with a voltage of 560 V. In contrast, when the gas-filled discharge tube embodying this invention was impressed with a similar impulse voltage to the above-mentioned case of the prior art, a discharge was initiated with a voltage of 440 V. This fact confirms that the gas-filled discharge tube embodying this invention can respond to a surge voltage with a lower impulse voltage than in the prior art.

Figure 2:
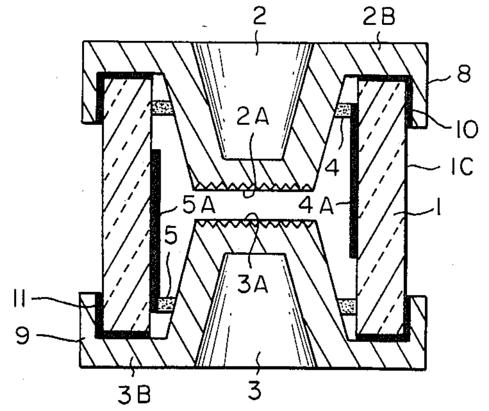
FIG. 2 is a longitudinal sectional view of a surge voltage arrester accordig to the second embodiment of the invention.

FIG. 2 is a longitudinal cross-sectional view of a surge voltage arrester according to a second embodiment of this invention. The parts of FIG. 2 that are the same as those of FIG. 1 are denoted by the same numerals. The embodiment of FIG. 2 differs from that of FIG. 1 in that in the first embodiment, the electrically conductive members 4, 5 and the external electrically conductive members 6, 7 capacitively coupled thereto are formed along the outer wall 1C of the hollow cylinder 1. Also the external electrically conductive members 6, 7 are electrically connected to the corresponding main electrodes. The second embodiment of FIG. 2 is characterized in that the flanges 2B, 3B of the main electrodes 2, 3 are respectively provided with bent portions 8, 9. Metal bonding materials or metalized layers 10, 11 are interposed between said bent portions 8, 9 and the outer wall 1C of the hollow cylinder 1. Said bent portions 8, 9 and electrically conductive members 4, 5 are capacitively coupled together with the insulation material of the hollow cylinder 1 interposed therebetween. The bent portions 8, 9 of FIG. 2 perform substantially the same function as the external electrically conductive members 6, 7 of FIG. 1. The surge voltage arrester of FIG. 2 has the same arrangement as that of FIG. 1 in other respects, and consequently ensures substantially the same function and effect as that of the first embodiment, a description thereof being omitted. Further, instead of providing the bent portions 8, 9 of FIG. 2, it is possible to wrap the main electrodes 2, 3 in, for example, a cup-shaped metal cap, and to electrically connect said metal cap to the main electrodes 2, 3, fit the open portion of said cap to the outer wall 1C of the hollow cylinder 1 with the metal bonded portions interposed therebetween, thereby ensuring substantially the same function as the bent portions 8, 9 of FIG. 2.

Figure 3:
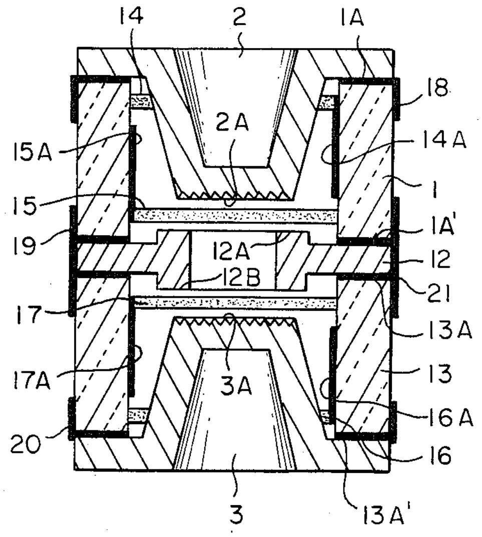
FIG. 3 is a longitudinal sectional view of a surge voltage arrester according to the third embodiment of the invention.

A description may now be made with reference to FIG. 3 of a surge voltage arrester according to a third embodiment of this invention. The parts of FIG. 3 the same as those of FIG. 1 are denoted by the same numerals. FIG. 3 represents a 3-electrode type of surge voltage arrester embodying this invention. In this third embodiment, a third electrode 12 is provided in addition to substantially the same hollow cylinder 1 and main electrodes 23 as described with reference to FIG. 1. Said third electrode 12 divides the hollow cylinder 1 into two compartments 1, 13. The main electrode 2 and third electrode 12 are respectively fitted in a gastight fasion to both openings 1A, 1A' of the hollow cylinder 1 as in the first embodiment of FIG. 1 in such a manner that the discharge planes 2A, 12A are set opposite to each other at a prescribed interval in the hollow cylinder 1. Further, the main electrode 2 and the third electrode 12 are fitted in a gastight fashion as described above to both openings 13A, 13A' of the hollow cylinder 13 in such a manner that the discharge planes 3A, 12B are set opposite to each other at a prescribed interval in the hollow cylinder 13. The above-mentioned construction constitutes the closed chamber of a 3-electrode type of gas-filled discharge tube. Electrically conductive members 14, 15 having substantially the same construction as those of FIG. 1, and narrow electrically conductive strips 14A, 15A electrically connected to said members 14, 15 and extending from one end to the other thereof are formed along the inner wall of the hollow cylinder 1 in such a manner that said members 14, 15, 14A, 15A are set opposite to the main electrode 2 and third electrode 12 at a prescribed interval. Further, electrically conductive members 16, 17 and narrow electrically conductive strips 16A, 17A all having the same construction as described above extend along the inner wall of the hollow cylinder 13. Moreover, external electrically conductive members 18, 19 respectively electrically connected to the main electrode 2 and third electrode 12 extend along the outer wall of the hollow cylinder 1 in such a manner that said external electrically conductive members 18, 19 are capacitively coupled to said electrically conductive members 14, 15 with the insulating material of the hollow cylinder 1 interposed therebetween. Similarly, external electrically conductive members 20, 21 respectively electrically connected to the main electrode 3 and third electrode 12 extend along the outer wall of the hollow cylinder 13 in such a manner that said external electrically conductive members 20, 21 are capacitively coupled to said electrically conductive members 16, 17 with the insulating material of the hollow cylinder 13 interposed therebetween.

A description may now be made of the operation of the surge voltage arrester of FIG. 3 according to the third embodiment of this invention. This third embodiment represents the so-called 3-electrode type of surge voltage arrester which is substantially the same as an integral assembly of two surge voltage arresters having the same construction as described with reference to FIG. 1. This assembly has substantially the same function as the single surge voltage arrestor of FIG. 1, a detailed description thereof being omitted. When the 3-electrode type surge voltage arrester of FIG. 3 is impressed with an abnormal surge voltage, a substantially uniform electric field is established, as in FIG. 1, between the main electrode 2 and the third electrode 12 as well as between the main electrode 3 and the third electrode 12. However, a nonuniform electric field is produced between the main electrode 2 and electrically conductive member 14, between the third electrode 12 and electrically conductive member 15, between the main electrode 3 and electrically conductive member 16, and between the third electrode 12 and electrically conductive member 17. As a result, a discharge is promoted between the main electrode 2 and the third electrode 12, as well as between the main electrode 3 and said third electrode 12, thereby effectively preventing a delay in the initiation of a discharge between said three electrodes 2, 3, 12 as in the first embodiment of FIG. 1. The third embodiment of FIG. 3 has the same function and effect as that of FIG. 1.

Throughout the foregoing embodiments, an electrically conductive member extending along the inner wall of the hollow cylinder may be formed by drawing a line with a graphite pencil or by depositing any other electrically conductive paint as previously mentioned. When, however, the hollow cylinder is prepared from glass or ceramic, it is preferred that those portions of the inner wall of the hollow cylinder on which the electrically conductive material is to be deposited should have their surface roughened in advance by a chemical or mechanical process and that the electrically conductive member should be formed. The reason for this is that the electrically conductive member can be securely fixed in place due to its being taken into the cavities formed in the roughened surface of the inner wall of the hollow cylinder.

When the electrically conductive member is formed by drawing a line with, for example, a graphite pencil, said pencil lead may be chosen to have a width ranging between 0.2 and 1.0 mm. If, however, the width of said lead exceeds the above-mentioned range, then variations may arise in the width with which the electrically conductive member is deposited, or in the force with which said conductive member is formed, thereby leading to irregularities in the level of the discharge-initiating voltage between the main electrodes. Therefore, it is most preferred that the width of the graphite core for drawing a line be set between 0.3 and 0.7 mm. In this case, the line-drawing operation is of course affected in various warp, depending on the hardness of the lead itself. For instance, the greater the hardness of the pencil lead, the more discontinuous the line drawn. Conversely, the softer the pencil lead, the greater the tendency to give rise to a variations in the width of the line drawn. Obviously, therefore, it is necessary to choose the hardness of the lead that exerts no harmful effect on the deliniation of the line.

The surge voltage arrester embodying this invention constructed as described above offers the following advantages:

(1) The electrically conductive members are capacitively coupled to the respective electrodes with the insulating material of the hollow cylinder interposed therebetween, thereby more noticeably elevating the effect of the capacitive coupling than the conventional surge voltage arrester in which the capacitive coupling between said conductive members and electrodes is undertaken with the sealed gas interposed therebetween which consequently improves the surge response characteristic.

(2) The improvement of the effect of the capacitive coupling allows for the reduction of the distance of the insulation between the electrically conductive members and electrodes, and the reduction of the width of the electrically conductive members, thereby facilitating the manufacture of a surge voltage arrester.

(3) The electrically conductive members which are not electrically connected to the electrodes can be drawn thereto without being adversely affected by the voltage for initiating the discharge of the surge voltage of the alternating or direct current, thereby reducing the impulse discharge-initiating voltage.

(4) Since it is possible to effectively prevent declines or variations in the voltage for initiating the discharge of A.C. or D.C. surge voltage, the subject surge voltage arrester can have its effective life elongated.

What is claimed is:

1. A surge voltage arrester comprising:

a hollow cylindrical body prepared from insulating material;

a pair of main electrodes which are fitted in a gastight fashion to both open ends of said hollow cylilndrical body to jointly define a closed chamber in such a manner that the discharge planes of said paired main electrodes are set opposite to each other at a prescribed interval in said hollow cylindrical body;

at least one electrically conductive member which extends along the inner wall of said hollow cylindrical body in its circumferential direction in such a manner that said electrically conductive member faces one of said main electrodes at a prescribed interval;

at least one electrically conductive strip which is electrically connected to said electrically conductive member and which extends along the inner wall of said hollow cylindrical body in its axial direction in such a manner that said electrically conductive strip faces the other main electrode at a prescribed interval; and at least one external electrically conductive member which is electrically connected to said one main electrode and extends along the outer wall of said hollow cylindrical body in such a manner that said external electrically conductive member is capacitively coupled to said one electrically conductive member.

2. A surge voltage arrester comprising:

a first hollow cylindrical body prepared from insulating material;

a first main electrode fitted in a gastight fashion to one of the open ends of said first hollow cylindrical body;

a second hollow cylindrical body which is prepared from insulating material and one of whose open ends is fitted in a gastight fasion to the other open end of said first hollow cylindrical body;

a second main electrode which is fitted in a gastight fashion to the other open end of said second hollow cylindrical body;

a third main electrode which is interposed in a gastight fasion between those open ends to which said first hollow cylindrical body and second hollow cylindrical body are fitted in a gastight fasion to jointly define a closed chamber, and whose discharge plane faces those of the first and second main electrodes at a prescribed interval;

at least two electrically conductive members which respectively extend along the inner walls of said first and second hollow cylindrical bodies so as to respectively face one of said first and third main electrodes constituting one group and one of said second and third main electrodes constituting another group at a prescribed interval;

at least two narrow electrically conductive strips which are respectively electrically connected to one of said electrically conductive members, and extend along the inner walls of said first and second hollow cylindrical bodies in the axial direction thereof and respectively face the other main electrode of said one group and the other main electrode of said another group at a prescribed interval; and at least two external electrically conductive members which are electrically connected to at least two of said first, second and third main electrodes and respectively extend along the outer walls of said first and second hollow cylindrical bodies so as to be capacitively coupled to said electrically conductive members.

3. The surge voltage arrester accordig to claim 1 or 2, wherein at least two electrically conductive members extending along the inner wall of said hollow cylindrical body in its circumferential direction are symmetrically set with each other.

4. The surge voltage arrester according to claim 1 or 2, wherein at least two narrower electrically conductive strips extending along the inner wall of said hollow cylindrical body in its axial direction are symmetrically set with each other.

5. The surge voltage arrester according to claim 1 or 2, wherein said electrically conductive member and narrow electrically conductive strip extending along the inner wall of said hollow cylindrical body are formed by coating electrically conductive material such as graphite or metal on the inner wall of said hollow cylindrical body.

6. The surge voltage arrester according to claim 1 or 2, wherein said electrically conductive member and narrow electrically conductive strip extending along the inner wall of said hollow cylindrical body are formed by drawing a line on the inner wall of said hollow cylindrical body with graphite having a diameter ranging between 0.2 and 1.0 mm.

7. The surge voltage arrester according to claim 1 or 2, wherein said external electrically conductive member extending along the outer wall of said hollow cylindrical body is formed by coating an electrically conductive material such as graphite or metal on said outer wall.

8. The surge voltage arrester according to claim 1 or 2, wherein said external electrically conductive member extending along the outer wall of said hollow cylindrical body is formed of a bent portion provided on the flange of said one main electrode.

9. The surge voltage arrester according to claim 1 or 2, wherein said external electrically conductive member extending along the outer wall of said hollow cylindrical body is formed of a cup-shaped metal cap which covers the outer walls of said one main electrode and hollow cylindrical body and which is electrically connected to said one main electrode.

10. The surge voltage arrester according to claim 1 or 2, wherein said external electrically conductive member extending along the outer wall of said hollow cylindrical body is formed of a metal-bonding material which is electrically connected to said one main electrode.

11. The surge voltage arrester according to claim 10, wherein said metal-bonding material is formed of a brazing material adapted for bonding said hollow cylindrical body with said one main electrode.

12. The surge voltage arrester according to claim 10, wherein said metal-bonding material is formed of a metalized layer deposited on said hollow cylindrical body.

* * * * *